No. 779,201. PATENTED JAN. 3, 1905.
F. S. BLACKMARR & J. L. WILLFORD.
FILTER AND PURIFIER.
APPLICATION FILED FEB. 11, 1902.
12 SHEETS—SHEET 1.
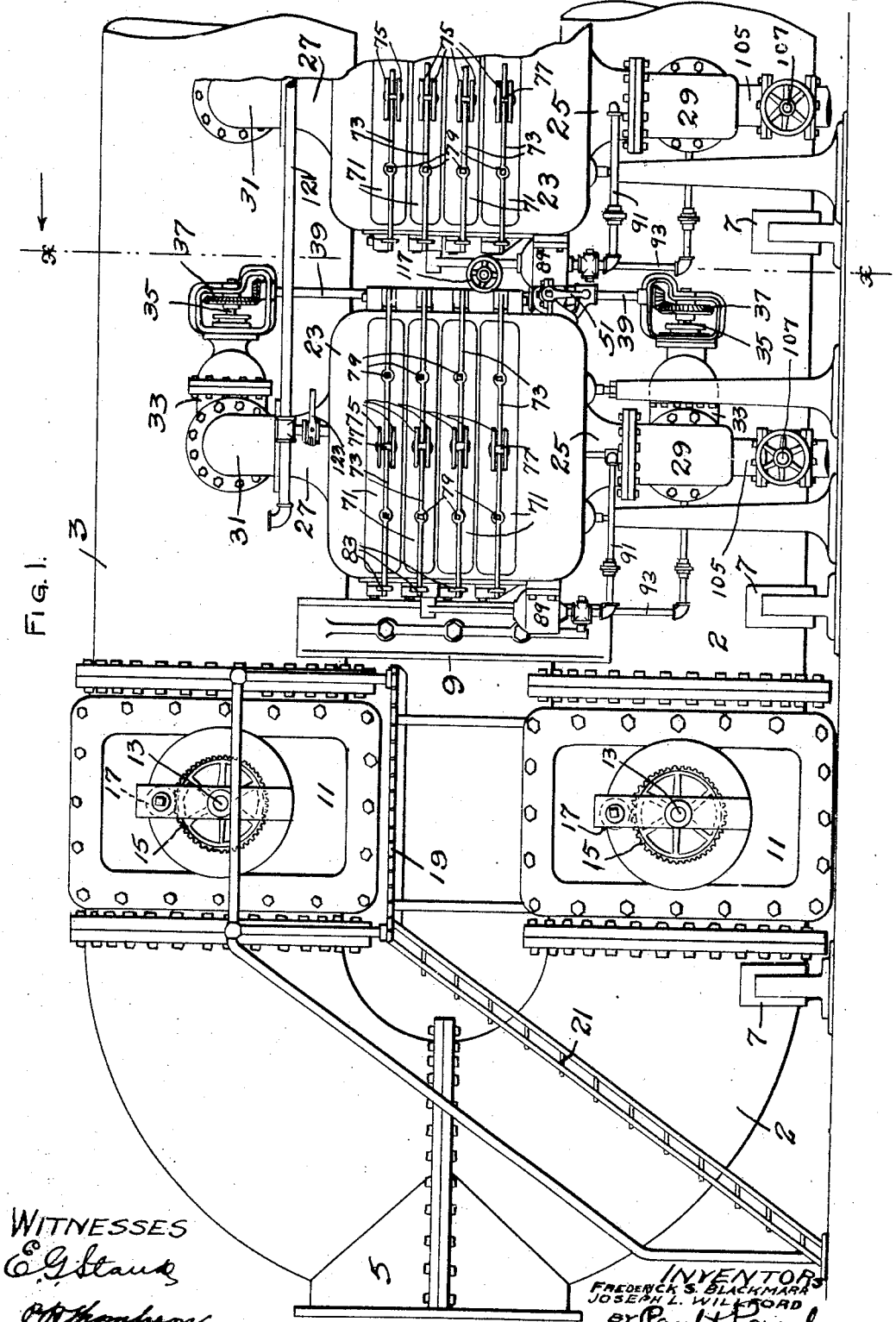

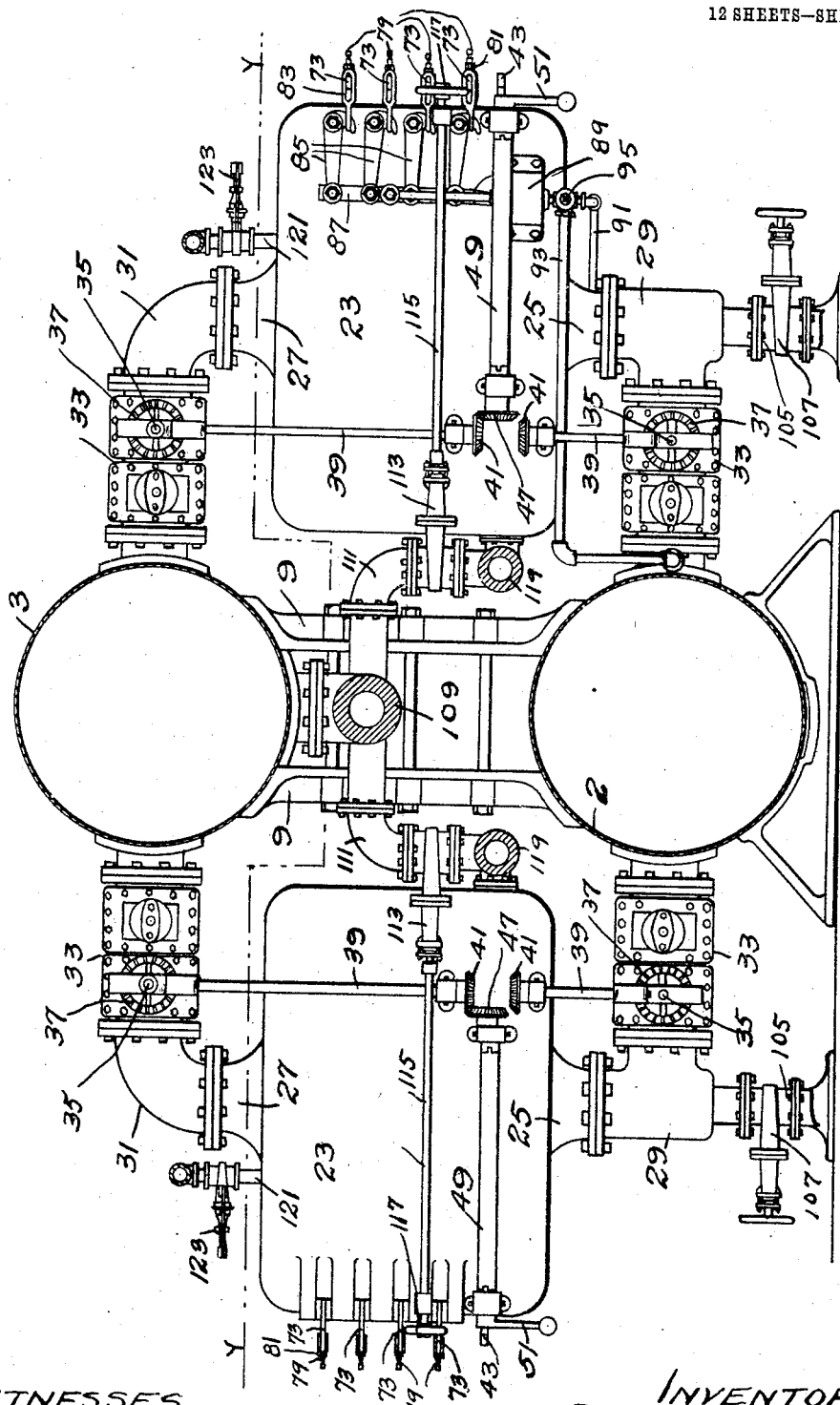

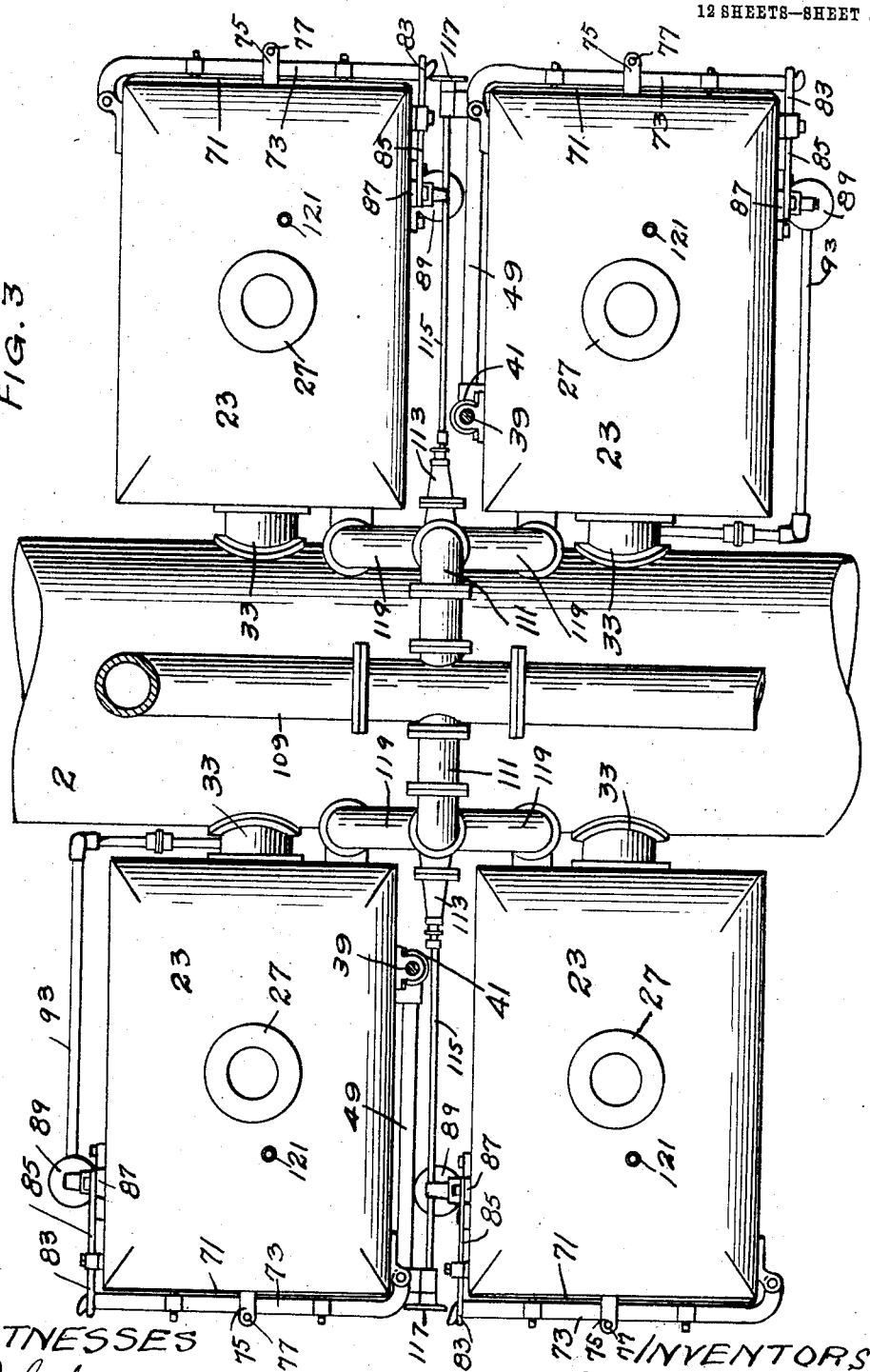

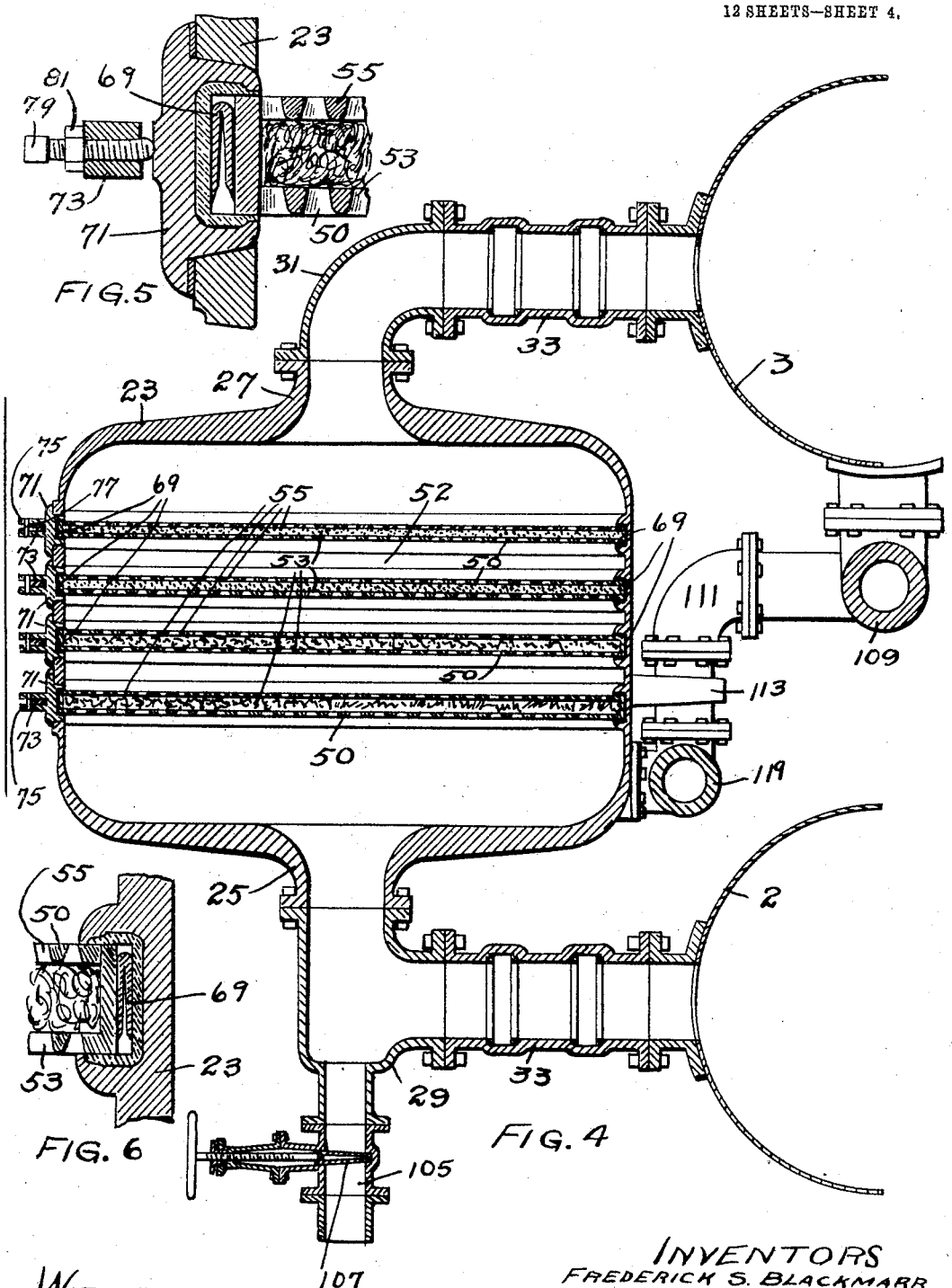

No. 779,201. PATENTED JAN. 3, 1905.
F. S. BLACKMARR & J. L. WILLFORD.
FILTER AND PURIFIER.
APPLICATION FILED FEB. 11, 1902.
12 SHEETS—SHEET 5.
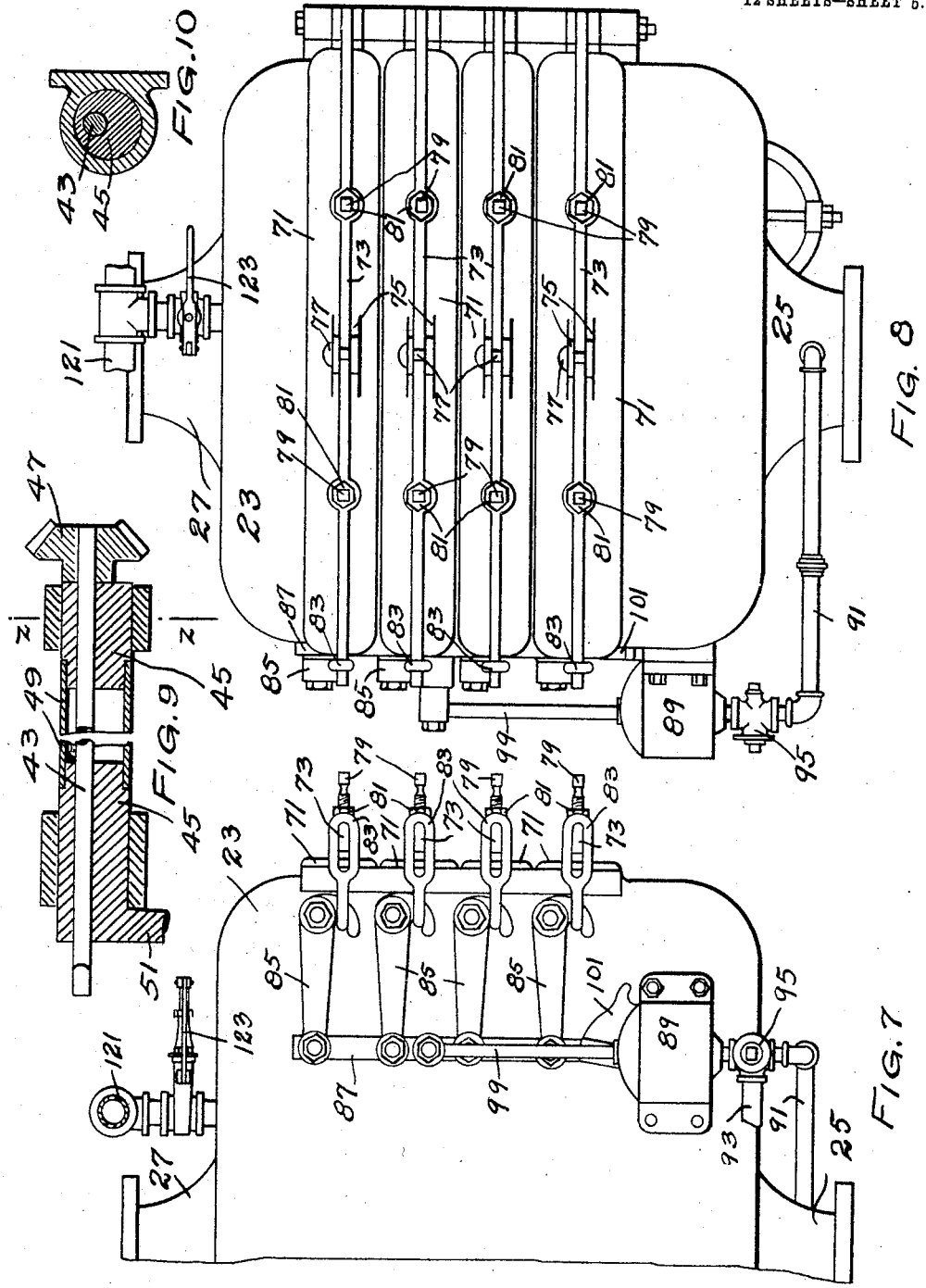
WITNESSES
C. G. Staude
P. R. Thompson
INVENTORS
FREDERICK S. BLACKMARR
JOSEPH L. WILLFORD
BY Paul & Paul
THEIR ATTORNEYS

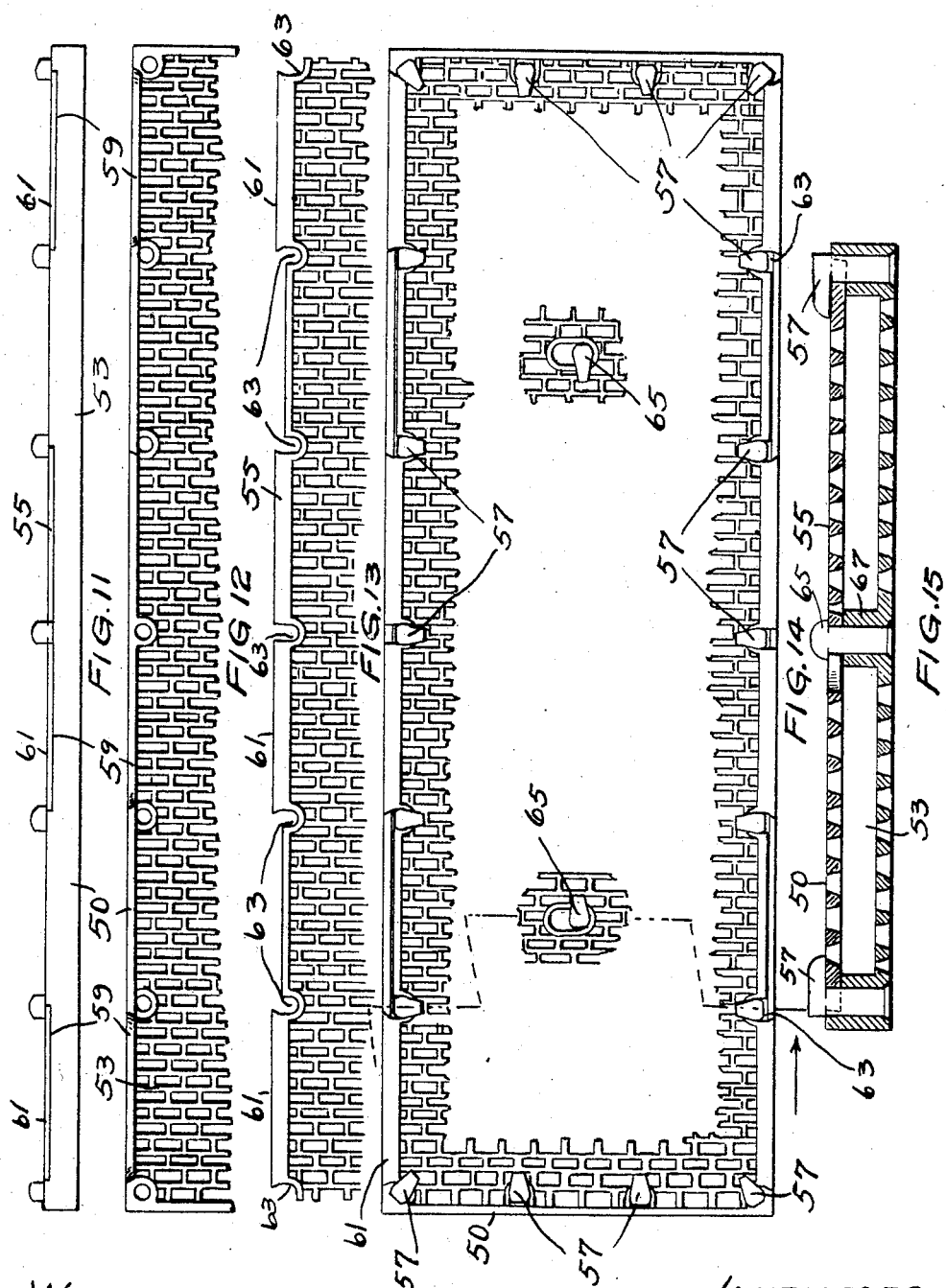

No. 779,201. PATENTED JAN. 3, 1905.
F. S. BLACKMARR & J. L. WILLFORD.
FILTER AND PURIFIER.
APPLICATION FILED FEB. 11, 1902.
12 SHEETS—SHEET 7.
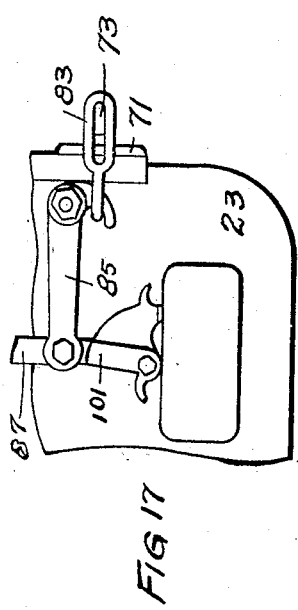
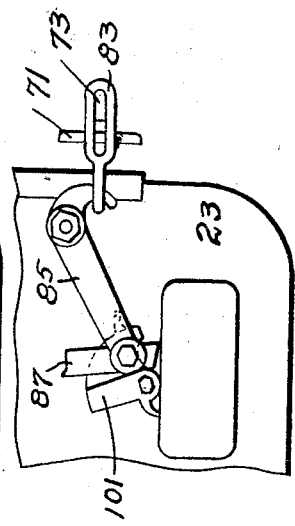
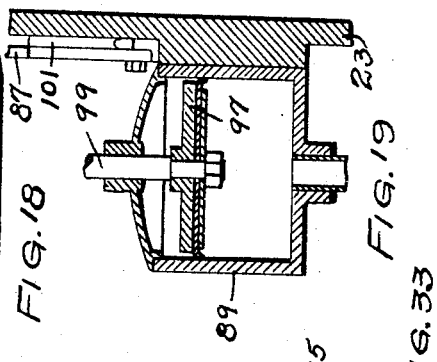
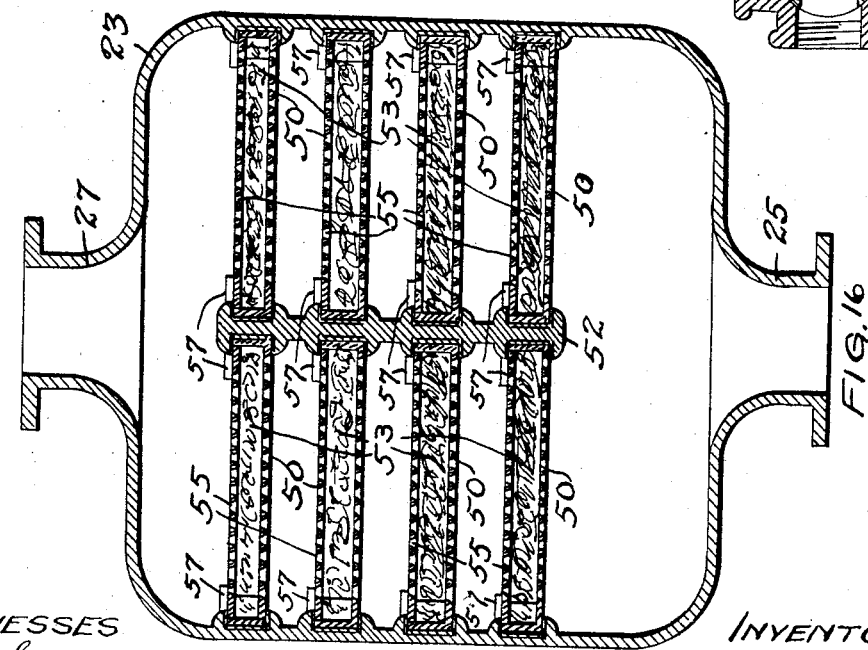
WITNESSES
INVENTORS
FREDERICK S. BLACKMARR
JOSEPH L. WILLFORD
BY Paul & Paul
THEIR ATTORNEYS

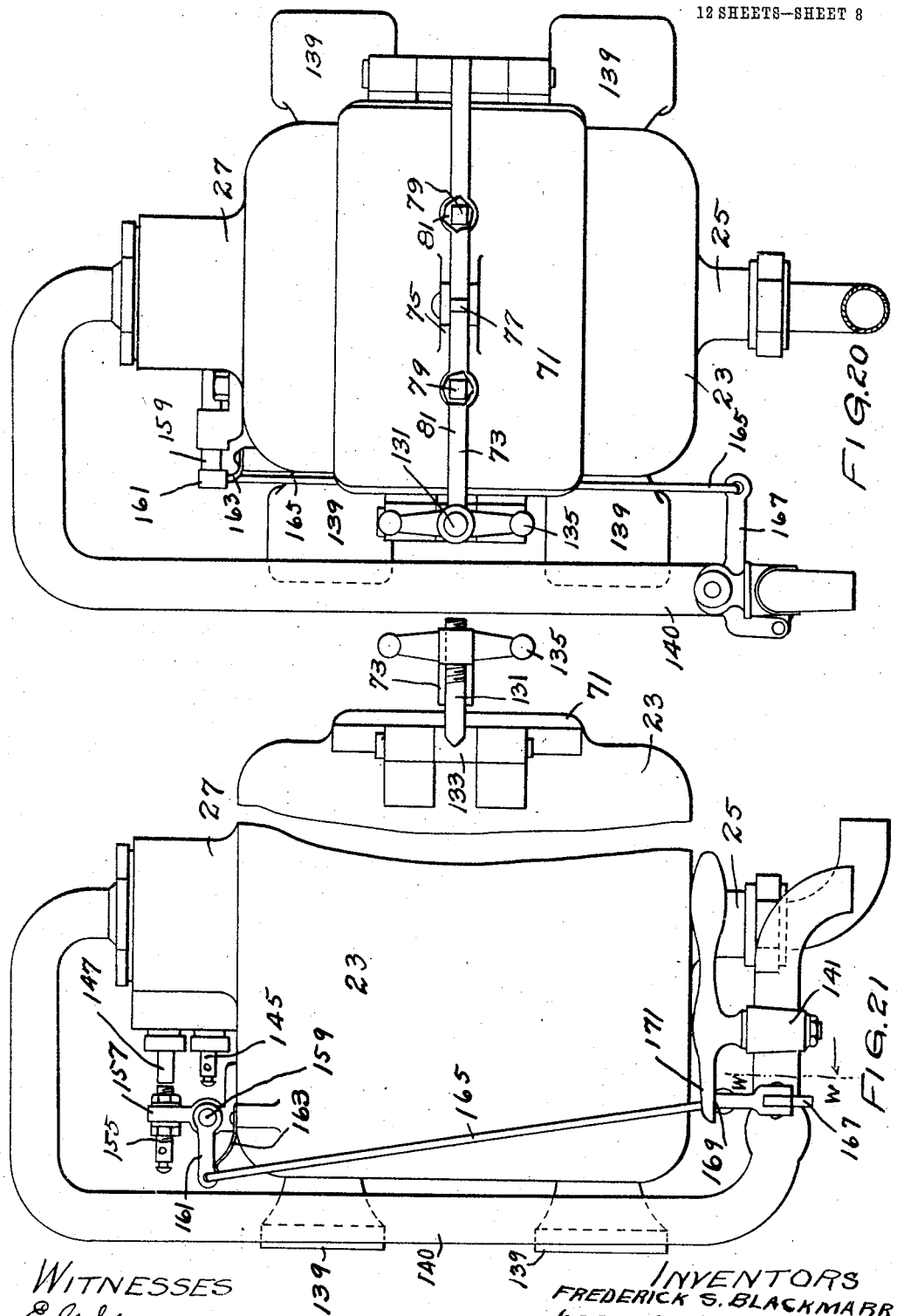

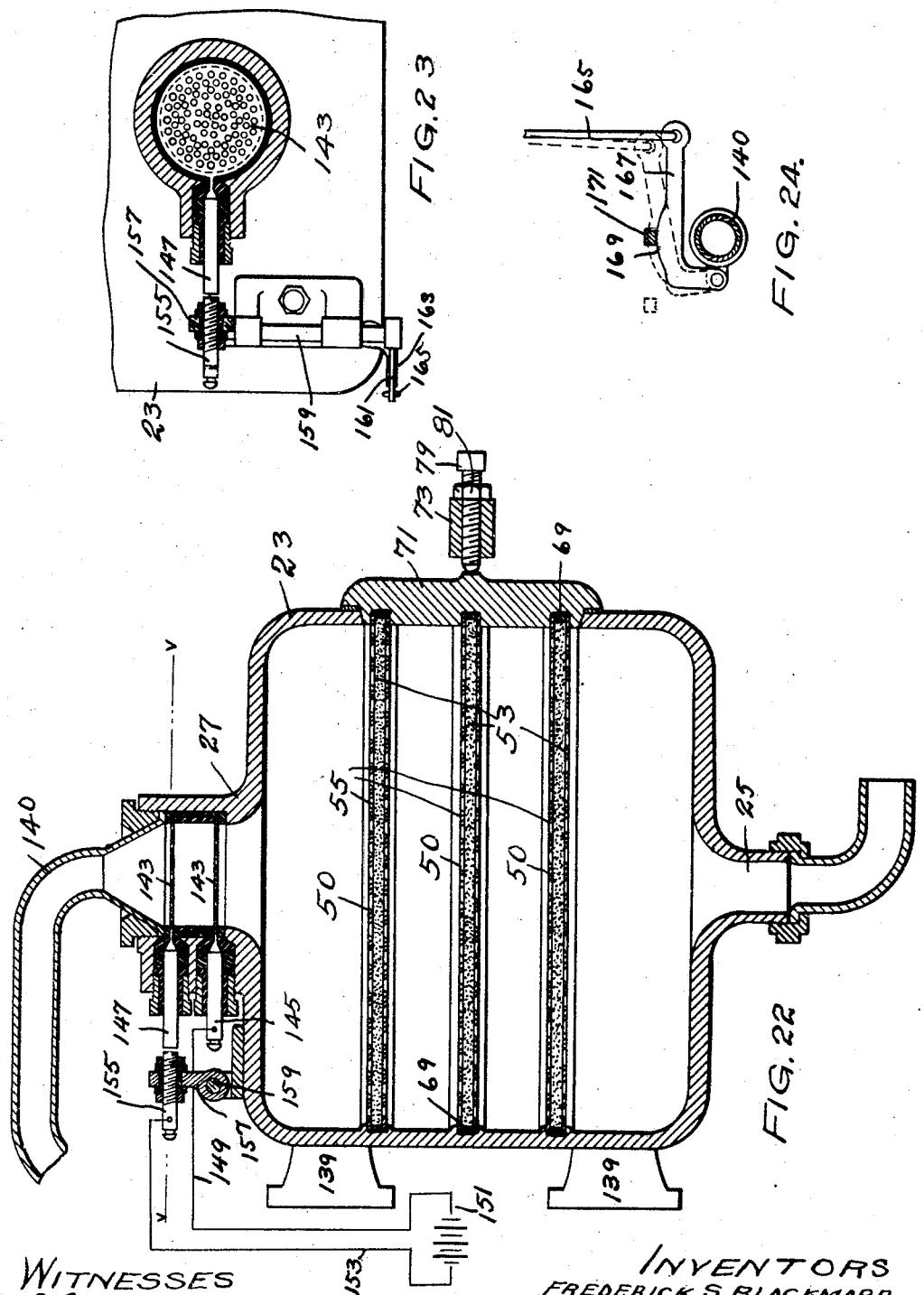

No. 779,201. PATENTED JAN. 3, 1905.
F. S. BLACKMARR & J. L. WILLFORD.
FILTER AND PURIFIER.
APPLICATION FILED FEB. 11, 1902.
12 SHEETS—SHEET 10.
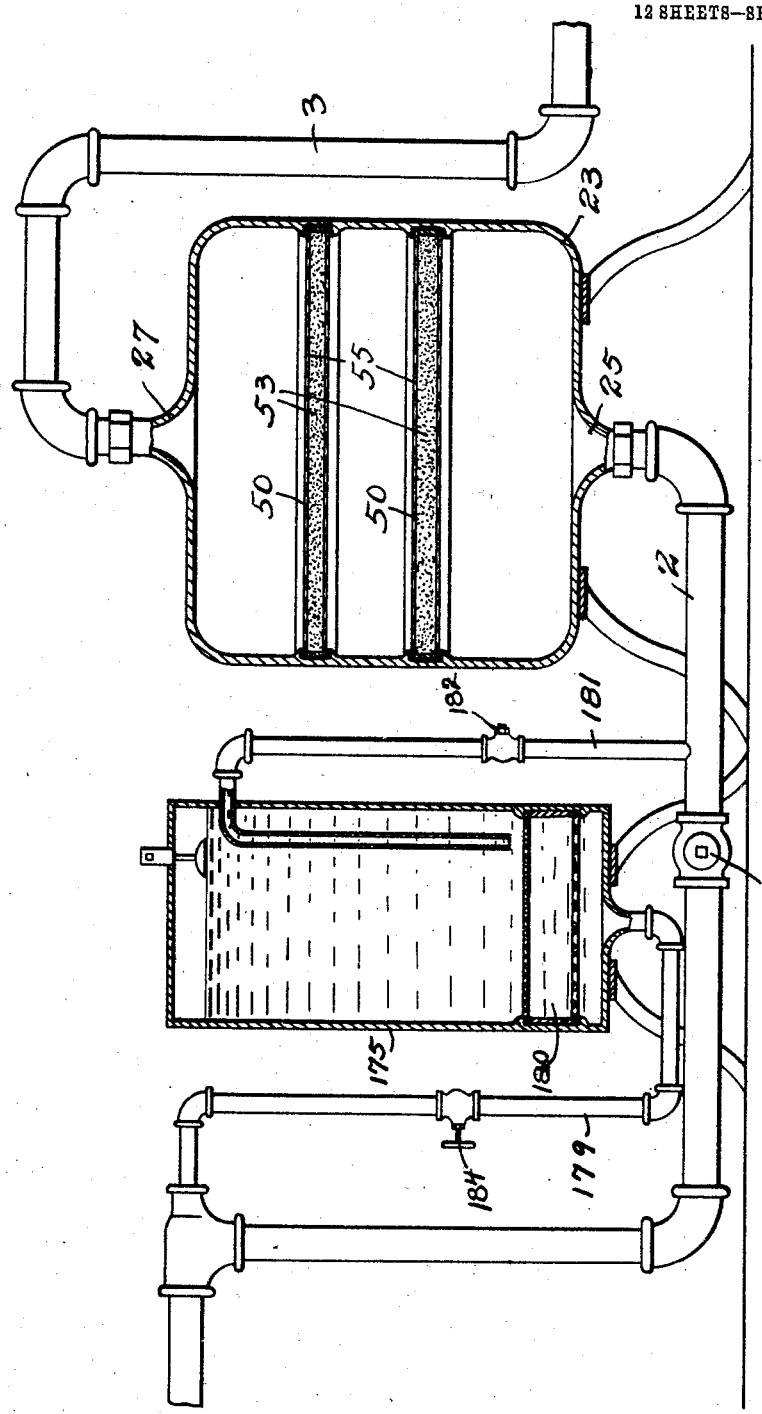
WITNESSES
INVENTORS
FREDERICK S. BLACKMARR
JOSEPH L. WILLFORD
BY Paul & Paul
THEIR ATTORNEYS No. 779,201. PATENTED JAN. 3, 1905.
F. S. BLACKMARR & J. L. WILLFORD.
FILTER AND PURIFIER.
APPLICATION FILED FEB. 11, 1902.

12 SHEETS—SHEET 11.

WITNESSES

INVENTORS
FREDERICK S. BLACKMARR
JOSEPH L. WILLFORD
BY Paul & Paul
THEIR ATTORNEYS

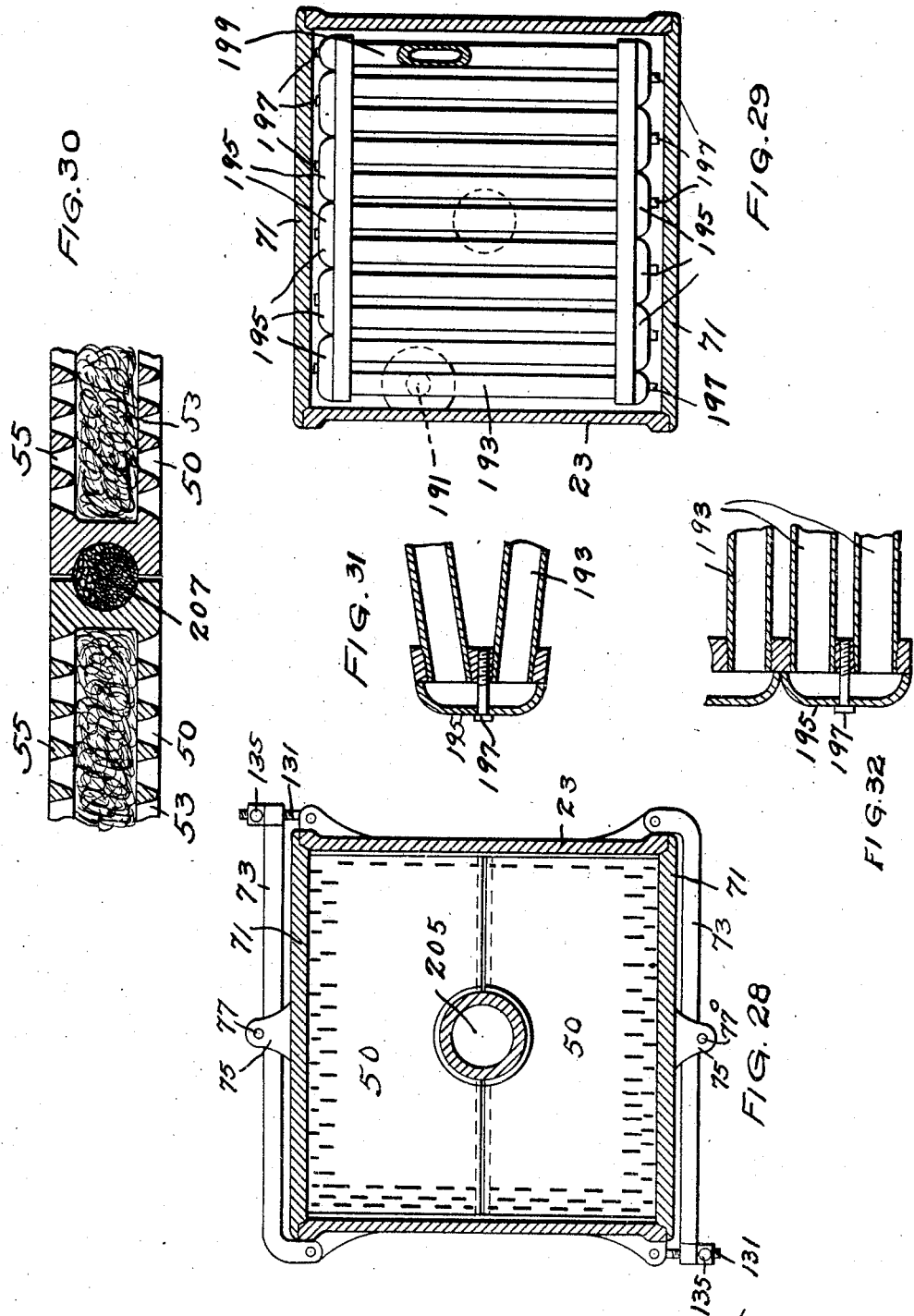

No. 779,201. Patented January 3, 1905.

UNITED STATES PATENT OFFICE.

FREDERICK S. BLACKMARR AND JOSEPH L. WILLFORD, OF MINNEAPOLIS, MINNESOTA.

FILTER AND PURIFIER.

SPECIFICATION forming part of Letters Patent No. 779,201, dated January 3, 1905.

Application filed February 11, 1902. Serial No. 93,552.

*To all whom it may concern:*

Be it known that we, FREDERICK S. BLACKMARR and JOSEPH L. WILLFORD, of Minneapolis, Hennepin county, Minnesota, have invented certain Improvements in Filters and Purifiers, of which the following is a specification.

The objects of this invention are, first, to provide an improved filter that can be applied to the filtering and purification of water and other liquids in any locality; second, to provide a filter that may be arranged in direct connection with the mains of a city water system, either between the source of supply and the pump or pumps, (when the water will be drawn through the filter by suction,) or that may be arranged between the pump or pumps and the mains or that may be applied between a reservoir and the main or mains leading therefrom.

The invention is also applicable to domestic water-filters and to filters for steam-boilers and to other purposes.

The invention consists generally in the constructions and combinations hereinafter described, and particularly pointed out in the claims.

Figure 27:
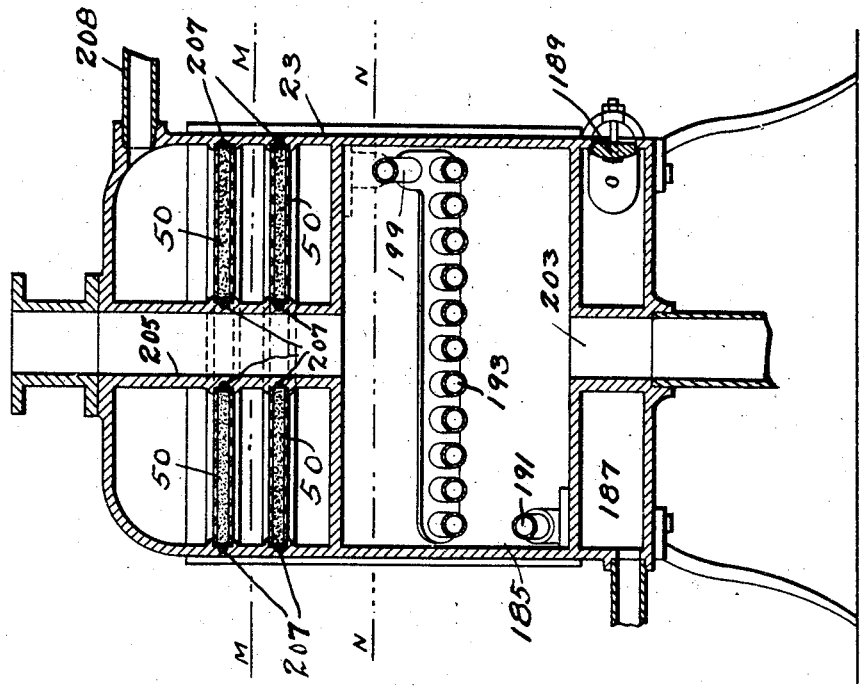
Figure 26:
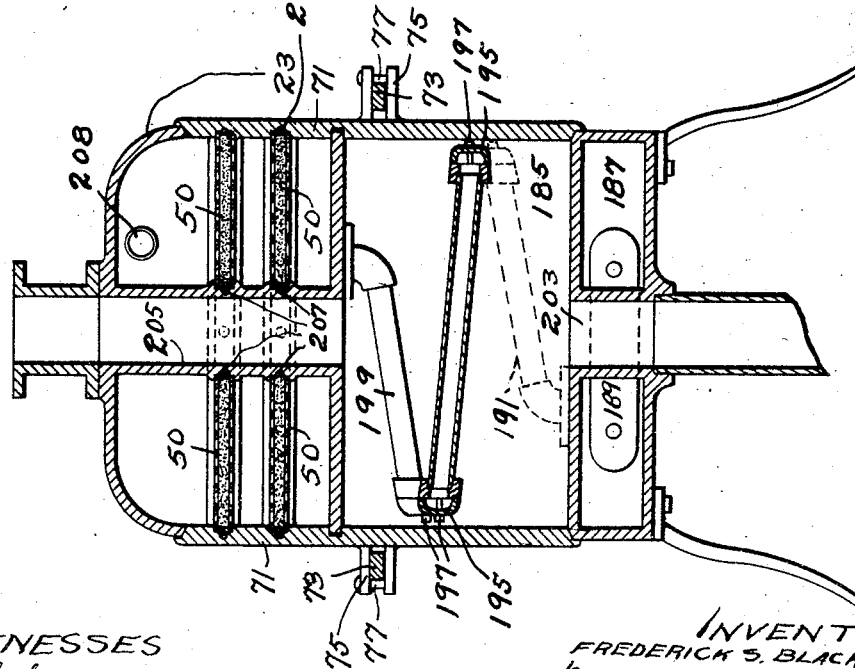

In the accompanying drawings, forming part of this specification, Figure 1 is a side elevation of a filter embodying our invention, the same being shown applied to a water-main such as is generally used as part of a city water system. Fig. 2 is a transverse section on line X X of Fig. 1. Fig. 3 is a horizontal plan section on line Y Y of Fig. 2. Fig. 4 is a vertical section through one of the filter cases and trays. Fig. 5 is a detail of one of the doors and showing the means for engaging the filter-tray. Fig. 6 is a detail of the edge of the filter-tray and the means for holding it in the wall of the case. Fig. 7 is a side elevation, and Fig. 8 a front elevation, of the means of securing the doors of the filter-case. Figs. 9 and 10 are details of the means for supporting one of the valve-operating shafts and showing also the means for adjusting the position of said shaft. Figs. 11, 12, 13, 14, and 15 are details of the filter-trays. Fig. 16 is a transverse section through the filter-case, showing the trays in position. Figs. 17 and 18 are details illustrating the means of locking the door-securing devices. Fig. 19 is a detail showing the means for controlling the locks of the doors of the filter-case. Figs. 20 and 21 are elevations of the front and one side of the filter-case as constructed for domestic uses. Fig. 22 is a section of the filter shown in Figs. 21 and 23 and showing also the means of making an electrical application to said filter. Fig. 23 is a detail section on line V V of Fig. 22. Fig. 24 is a detail illustrating the means for breaking the electric circuit when the filter is not in use. Fig. 25 is a section of a modified construction, showing the application of the same to a feed-water heater. Fig. 26 is a vertical section showing our filter applied to a feed-water heater. Fig. 27 is a similar section taken on a plane at right angles to that of Fig. 26. Fig. 28 is a horizontal section on line M M of Fig. 27. Fig. 29 is a horizontal section on line N N of Fig. 27. Fig. 30 is a detail showing the construction of the filter as it is applied in Figs. 26 and 27. Figs. 31 and 32 are details of the water-heater. Fig. 33 is a detail of the three-way valve.

In all of the drawings, 2 represents the pipe, main, or conductor through which the water to be purified or filtered is conducted to the filter, and 3 represents the pipe, main, or conductor into which the water passes after going through the filter.

In Figs. 1, 2, 3, and 4 of the drawings we have shown the filter applied to mains or conductors such as are ordinarily used in a city water-supply system. As here shown, the mains 2 and 3 are joined together and they are provided with a common coupling 5, to which the conductor or main leading from the source of supply may be connected. The main 2 is supported, preferably, upon a series of shoes 7, these shoes being placed upon suitable foundations, and suitable supports or saddles 9 (see Fig. 2) are arranged between the two mains and form a support for the upper one. Each of the mains 2 and 3 is provided with a suitable valve, which may be of any ordinary or preferred construction. We have not shown the construction of this valve; but it may be substantially similar to the construction of the other cut-off valves herein shown and described. These valves are preferably arranged in suitable valve-casings 11, which are placed between the principal or straight section of the main or conductor and the elbow-section, as illustrated in Fig. 1. Each valve is provided with a suitable valve-operating stem 13, provided with a gear 15, that is engaged by a pinion 17. Ordinarily the valve of the upper main or conductor will be closed and that of the lower main or conductor will be open. The water will then pass into the lower main and from that main through the series of filters hereinafter described to the upper main. If for any reason it is necessary or desirable to pass the water directly into the main 3, the upper valve may be opened and the lower valve may be closed whenever it is found necessary or desirable to do so.

We have shown in Fig. 1 of the drawings a suitable platform 19, upon which a person may stand in operating the valve of the main 3, and have shown suitable steps 21 leading to this platform. The filters that we employ are preferably arranged along both sides of the mains, so as to receive the water from one main and conduct it into the other. As the water passes through the filters it is thoroughly filtered and all of the foreign material is removed therefrom. Our improved filters are constructed with the substantially rectangular casing 23, having flanged joints 25 and 27 at the lower and upper ends, and these casings are connected by suitable pipe connections 29 and 31 to the valve-casings 33, and these valve-casings are suitably connected to the mains or conductors 2 and 3. The valve-casings 33 are preferably constructed so as to each receive two valves, one of said valves being arranged for ordinary use in cutting off communication between the filter and the main and the other valve being simply for safety and being adapted to be operated to shut off communication between the main and the filter in case of accident to the other valve. The valves that we prefer to employ in the valve-casings 33 may be of any suitable construction. They are preferably what are designated as "straightway" valves, and each is provided with a valve-stem 35 and gear 37, adapted to be operated by a shaft 39, mounted in suitable bearings and provided with a miter-gear 41. For the purpose of operating either of the shafts 39 from the front of the filter we prefer to provide a shaft 43, mounted in the eccentric box or boxes 45 and carrying a miter-gear 47. As here shown, the boxes 45 are connected by a pipe 49 and the outer box is provided with an operating-lever 51. By means of this lever the eccentric boxes may be turned so as to bring the miter-gear 47 into mesh with each of the miter-gears 41. By this means we are enabled to operate either of the cut-off valves in the valve-casings 33 from a position in front of the filter-casings.

We provide in each of the casings 23 a series of removable filter-trays 50. The construction of tray that we prefer to employ is shown in detail in Figs. 11 to 15. We prefer to provide the filter-casing 23 with a vertical transverse partition 52, formed integrally with said casings and provided with ways adapted to coöperate with corresponding ways in the wall of the casing to receive the filter-trays and permit of their ready removal.

Each of the filter-trays consists, preferably, of a shallow receptacle 53, having a series of openings in the bottom thereof, and the cover 55 also having openings, said cover being adapted to fit upon and be secured to the receptacle 53, as hereinafter described. The filtering material is placed within the tray or receptacle 53, and the cover 55 is placed thereon and is secured in position, and the tray is then slid into the ways in the casing 23. The trays 53 and covers 55 are preferably formed of cast-steel, and any suitable means may be employed for securing the covers to the trays. The means that we have shown and which we consider preferable for this purpose is illustrated in the detailed views upon Sheet 6 of the drawings. As here shown, the tray is provided with a series of stud-locks 57, which consists of a stud provided with a hook, said stud being capable of turning upon its axis and the back of the hook being flat, so as to stand parallel with the edge of the tray when the hook is in locking position. The upper edge of the tray is provided with a series of dovetailed recesses 59, and each of the covers is provided with corresponding projections 61, that are adapted to fit into these recesses, as illustrated in Figs. 11, 14, and 15. The cover is also provided with recesses 63, that receive the stud-locks 57. We may also provide the central stud-locks 65 for the purpose of assisting in locking the cover firmly to the tray. This stud-lock passes through a boss 67 on the tray, the upper end of the boss forming a bearing for the cover at this point. It will be understood that these trays will be subjected to heavy pressure from the water that is being passed through the filter. This pressure tends to flex or buckle the trays. By providing the dovetailed connection between the cover and the edge of each tray and also by providing the bearing in the center we obtain the combined strength of both the tray and the cover to sustain this pressure. The dovetailed connection between the cover and the tray also serves to prevent the spreading of the side walls of the tray.

We fill each of the filter-trays with suitable filtering material, and we may place in one or more of said trays with the filtering material a suitable coagulant—such, for example, as alumnated chalk. The filtering material may be varied as may be required for the particular conditions under which the filter is used. In some instances it will be preferable to use chipped sponge in the lower tray, gravel in the second tray, sand in the third tray, and animal charcoal in the upper tray. It will be necessary to place the coagulating material usually in the lower tray only. We prefer also to provide means for forming a water-tight joint batween the edges of the filter-trays and the walls and partition by which said trays are supported. As here shown, the walls and partition are provided with suitable recesses filled with babbitt to the proper size to form ways to receive the edges of the trays. Within each way and between its perpendicular wall and the edge of the tray we place an inverted-U-shaped packing 69, formed of leather or other suitable material. The lower edges of the packing are preferably chamfered off on the inside to form a knife-edge, and when the packing is in position the pressure of the water tends to expand the packing, thereby making a tight joint around the edge of the tray, and the greater the pressure of the water the tighter the joint will be. We also provide in one wall of the casing 23 a series of doors which may be opened to permit the insertion or the withdrawal of the trays. We prefer to provide an opening in the front wall of the casing, through which each of the filter-trays may be inserted or removed, and we provide a door 71 for the purpose of closing each of these openings. Each door 71 is preferably supported at the center thereof upon a bar 73. The bars 73 are each hinged at one end to the side wall of the casing and passes across the center of the corresponding door, and at its opposite end is provided with means for locking it to the casing and holding the door in closed position. The door that we prefer to use is shown in detail in Fig. 5. It is preferably of wedge form in cross-section and provided with a babbitted recess on its inner surface for receiving the front edge of the tray, and the U-shaped packing 69, hereinbefore described, is also provided in this recess between the perpendicular wall of the recess and the edge of the tray. The door is provided, preferably at or near its center point with lugs 75, and a bar 73 passes between these lugs. Said lugs are connected outside of the bar by a pin or bolt 77. The bar 73 is also provided at each side of the center with a suitable set-screw 79 and check-nut 81 for the purpose of equalizing the pressure upon the door. We also provide suitable means for locking the doors in their closed position. As here shown, the end of each bar 73 passes through a suitable link 83. A series of levers are pivoted upon the wall of the casing 23, and these levers are provided with hooks adapted to engage the links 83. The opposite ends of the levers 85 are pivotally connected to a vertically-moving bar 87, and when the levers and links are in position shown in Fig. 17 of the drawings the doors will be held in their closed position. When the levers are held in the position shown in Fig. 18 of the drawings the doors will be unlocked, and the links may then be disengaged from the bars 73 and the doors may be opened for the removal or insertion of the trays. We prefer to provide means whereby the levers and hooks 85 will be operated by water-pressure for the purpose of locking the doors and retaining them in their locked position. For this purpose we provide a cylinder 89, connected, preferably, to the lower part of the casing 23 by a suitable pipe 91 and connected also to the main 2 by a pipe 93. A suitable three-way valve 95 is provided between the cylinder 89 and the pipes 91 and 93, and by means of this valve pressure may be applied to the cylinder either directly from the main or from the casing 23. Arranged within the cylinder 89 is a suitable piston 97, having a piston-rod 99, that is connected to the vertically-moving bar 87. With this construction, connection being made between the main 2 and the cylinder 89, the piston 97 is forced upward in the cylinder, thereby raising the bar 87 and turning the levers 85 so as to firmly close the doors and hold them in their closed position. The piston will be held in its raised position by the pressure of the water within the cylinder. For the purpose of locking the vertically-moving bar 87 we prefer to provide at the lower end of each bar the pivoted safety-block 101. This block is pivoted on the wall of the casing 23, and it is adapted to turn automatically by gravity into the position illustrated in Fig. 17, when a projecting portion of the block comes directly under the lower end of the bar 87 and prevents any downward movement of said bar, and hence prevents the unlocking of the doors. By turning the block into the position as shown in Fig. 18 the bar 87 may be lowered and the doors unlocked. This device forms a safety-lock and prevents the unlocking of the doors in case of accident to the pressure device by which the doors are closed and are ordinarily held in closed position. It will be seen that it is impossible to open the doors so long as the pressure from the main 2 remains upon the cylinder 89. When, however, any one of the filters has been cut off from the mains by the valves already described and the water remaining in the filter-casing has been drawn off by means hereinafter described, as soon as the water in the filter-casing has been lowered to a point below the lower door the safety-lock 101 may be turned so as to permit movement of the bar 87 and the three-way valve may be turned so as to cut off the connection from the main to the cylinder 89 and to open the connection between the cylinder and the casing 23. As the water is drawn out of the filter-casing it will also escape from the cylinder 89, the piston 97 will move downward in the cylinder, and all the doors will be unlocked.

The pipe connection 29 at the lower end of each filter-casing has preferably connected to it a waste-pipe 105, provided with a suitable cut-off valve 107. By this means the water in the filter-casing 23 may be permitted to escape at any time, and any sediment collected in the lower part of the casing may be drawn off with this water. The lower portion of the pipe connection 29 forms a settling-chamber in which sand or heavy material will accumulate, and this may be drawn off at any time by opening the valve 107 and permitting a portion of the water to escape through the waste-pipe 105.

We also prefer to provide means for flushing the lower portion of each of the filter-casings 23. As here shown, we provide a pipe 109, that is connected to the main 3. This pipe is provided with branch pipes 111, connected, preferably, in pairs to the filter-casings 23. (See Fig. 3.) A suitable valve 113 is provided in the pipe 111 and is adapted to be operated from the front of the filter-casings by rod 115 and hand-wheel 117. By closing the valves in the lower valve-casings 33 and opening the valves 113 and 107 the water is permitted to flow from the main 3 into the lower part of the filter-casing 23 and out through the waste-pipe 105, thereby flushing said casing and removing any material that may have collected therein. The connection from pipe 111 to the filter-casings 23 is preferably made through the branch pipes 119, which connect with the filter-casing near one corner thereof. By this means a centrifugal motion is obtained in the current of water as it goes through the filter-casings, and thereby the interior of the casings will be thoroughly washed, and all of the material will be thrown to the center by this action of the water and will pass out through the opening 105 in the bottom of the casing.

We also prefer to provide a steam-pipe 121, that is connected, preferably, to the upper portion of each of the filter-casings 23, and a suitable valve 123 is preferably provided to control the admission of steam to each casing. By this means after the water has been drawn out from any casing the steam may be admitted thereto, and thereby any organic matter in said casing will be destroyed. The trays will ordinarily be removed before the admission of steam to the casings, and if it is desired to subject them to the action of steam this may be done by placing them in a separate suitable receptacle to which steam may be admitted.

In Figs. 20 and 21 we have shown the filter as it is constructed especially for domestic use. In this instance the trays are arranged in the casing 23 and a single door 71 is provided, through which all of the trays may be inserted or removed. This door is similar to the doors already described, but is provided with recesses for the edges of all of the trays. (See Fig. 22.) The locking-bar 73 is hinged at one end to the casing 23 and at its opposite end is provided with a fork adapted to receive a threaded bolt 131, that is mounted upon a pivot-pin 133. Said bolt is provided with a hand-nut 135. The bolt may be swung into the fork in the bar and the hand-nut screwed down against the bar, thereby securely closing the door. By loosening the hand-nut the bolt may be swung out of engagement with the bar and the door be released. The casing 23 is in this instance preferably provided with suitable brackets 139, by means of which it may be secured to a wall or other support.

In connection with the filter for domestic use we prefer to provide means for sending a current of electricity through the water, preferably at such time as the water is being drawn from the filter-casing. As here shown, the pipe 140 is connected to the top of the filter-casing, and it is provided with a suitable faucet 141. Perforated metallic plates 143 or other suitable conductors are arranged in the opening from the casing. These conductors are arranged at a short distance apart, and they are suitably insulated from each other and from the casing. Insulated posts 145 and 147 are connected to these conductors. A conductor 149 leads from the post 145 to a suitable battery 151, and a conductor 153 leads from the battery 151 to a suitable circuit-closer. This circuit-closer consists, preferably, of an insulated contact-screw 155, mounted in a stud 157, that is secured on a rock-shaft 159. This shaft is provided with a crank-arm 161, and a spring 163 engages said arm and tends to hold the contact-screw against the post 147. A rod 163 is connected to the crank-arm 161 and to a lever 167, arranged adjacent to the faucet. This lever is provided with a cam-surface 169, adapted to be engaged by an extension 171 on the faucet-lever. When the faucet is closed, the circuit-closer will be out of contact with the post of the conductor. When the faucet is opened, the circuit is closed and the electric current passes from one of the metallic plates to the other through the water that is passing out of the casing. This action decomposes a portion of the water and converts it into oxygen and hydrogen and converts considerable portions of the oxygen into ozone.

In Fig. 25 we have shown the filter adapted for use in connection with a steam-boiler feed-water heater. As here shown, a tank 175 is provided, and this tank is connected to the conductor 2, leading to the filter-casing 23, by pipes 179 and 181. The pipe 181 extends into the tank, and its open end is arranged nearly at the bottom thereof. The top of this pipe is slightly below the top of the tank and below the points to which the water will rise in the tank. A suitable tray 180 is arranged in the lower part of this tank, and in this tray the chemicals that are desired for purifying the water may be placed. The conductor 2 is provided with a check-valve 177 and the pipe 181 with a check-valve 182. The pipe 179 is provided with a cut-off valve 184. By opening the valve 184 a small amount of water will pass through the pipe 179 into the tank 175, and a small amount will also be taken out of the tank 175 by the pipe 181 and conducted into the pipe 2, where it will mingle with the water that has passed directly along in the pipe 2. The chemicals which pass from the tank 175, with the water, through the pipe 181, entering the pipe 2 and mingling with the water therein, will act upon that water before it reaches the filter-trays in the casing 23. Where it is desired to soften hard water, chalk and bicarbonate of lime in proportion of about sixteen (16) to seven (7) may be placed in the tray 180 and water allowed to pass freely through this material and through the tank 175. Where it is desired to neutralize and remove alkali from the water before it enters the feed-water heater, a suitable acid is placed in the tank, the valve 184 is opened, and the tank filled with water. Then the valve is closed or nearly closed and the water and acid drawn off. This water and acid will enter the pipe 2, and the acid will neutralize the alkali, and the sediment formed will be deposited in the lower part of the casing 23, and this sediment will be deposited before the water reaches the filter-trays.

In Figs. 26 to 32 we have shown a filter applied to a feed-water heater for steam-boilers. As here shown, the heater-casing 185 has at its lower part a chamber 187 to receive the water to be filtered and purified. This chamber has an opening at one end provided with a cover 189, by means of which said opening may be closed and which cover may be removed when it is desired to clean out any sediment that collects in said chamber. From this chamber a pipe 191 leads to a tubular grate 193. This grate consists of a series of tubes connected together, as shown in Figs. 31 and 32, by a series of caps 195 and bolts 197. This grate is also connected by the pipe 199 with the filter-chamber 23, which in this instance may be formed integrally with the casing of the heater. This casing is provided at each side with a removable door similar to the doors already described, 71, and the filter-trays 49 are inserted from opposite sides into ways in the wall of this casing. The central opening 203 provides communication with the heater-casing, and a pipe or tube 205 extends from the heating-chamber of the casing centrally through the filter-casing. The filter-trays being inserted from opposite sides of the casing 23, it is necessary to provide a packing 207 between the meeting edges of the trays, so as to form a water-tight joint between said trays. With this construction the water is permitted to enter the settlings-chamber 187, and being brought in contact with the upper plate of said chamber, which is heated by steam which enters the heater-chamber through the opening 203, a considerable portion of the sediment and material carried by the water will be precipitated and deposited in the chamber 187. The water passes from this chamber through the pipe 191, then through the tubular grate 193, and then through the pipe 199 into the filter-casing 23. Another portion of the sediment and other material will be deposited upon the bottom of the filter-casing. The bottom-plate 23' of the heater-casing 185, and as the water comes in contact with this hot plate the sediment in filter-casing is heated by the steam in the the water is deposited on the plate. By introducing suitable chemicals into the water before it enters the chamber 187 we secure a ready precipitation of the sediment from the water, and it is left in the chamber in a loose condition and not in the form of scale on the plate. The water will then pass through the filter-trays, and any remaining material will be removed by the filters, and the water may then pass through the pipe 208 directly to the boiler. The doors for the filter-casing are preferably so arranged as to cover also the sides of the heating-chamber, as shown in Figs. 26 and 27, so that by removing these doors access may be had to the tubes within the heating-chamber, and by removing the caps 195 access may be had to the interior of the tubes for the purpose of cleaning them.

The filter herein shown and described can be applied to the filtering and purification of water and other liquids in any position or locality. The filter may be arranged so as to connect directly with the mains of a city water system, and they may be located, if preferred, between the source of supply and the pump or pumps. In this case the water would be drawn by suction through the filters. Usually, however, the filters will be arranged in the mains or between the pump or pumps and the mains, so that after passing through the pump or pumps the water will be passed through the filters. In some instances the filter may be applied between a reservoir and the main or mains leading therefrom.

Among the advantages of our improved filter are the cheapness of construction and the ease with which the filter-trays may be removed and cleansed or new material supplied thereto and the fact that any number of filter-casings may be employed and the capacity of the filtering plant increased by adding additional filter-casings from time to time as required.

We do not limit ourselves to the details of the construction, as it is obvious that the same may be modified in many particulars without departing from our invention.

We claim as our invention—

1. The combination, with the filter-casing provided with a series of openings in its side wall, of a series of removable filter-trays arranged to be inserted or removed through said openings, doors closing said openings, locks for said doors, and liquid-pressure means for operating said locks, substantially as described.

2. The combination, with the filter-casing provided with an opening in its wall, of a filter-tray adapted to be inserted or removed through said opening, a door arranged to close said opening and means operated by liquid-pressure for securing said door in its closed position, substantially as described.

3. The combination, with the filter-casing provided with one or more openings in its wall, of a suitable door or doors closing said openings, locks for securing said doors in their closed position, and means operated by liquid-pressure for controlling said locks, substantially as described.

4. The combination, with a suitable filter-casing provided with openings in its side wall, of filter-trays adapted to be inserted or removed through said openings, doors for closing said openings, locks for securing said doors in their closed position, a suitable cylinder, a piston arranged within said cylinder, and provided with a piston-rod connected with said locks, and means for admitting water under pressure into said cylinder, substantially as described.

5. The combination, with the filter-casing provided with an opening in its side wall, of a door 71 closing said opening, a hinged bar 73 upon which said door is supported, a link 83 arranged to engage said door, a lever 85 engaging said link, and means for operating said lever, substantially as described.

6. The combination, with the filter-casing and doors, of the locking-levers 85, a bar 87 to which said levers are connected, means for moving said bar, and the pivoted block 101 forming a safety-lock for said bar, substantially as described.

7. The combination, with the filter-tray provided with the side walls and with openings in its bottom, of a cover having a series of openings and fitting upon said tray, and swiveled hook-studs for locking said cover in position, substantially as described.

8. The combination, with the filter-tray, provided with side walls and having a series of openings in its bottom, and with dovetailed recesses upon the upper edges of its side walls, of a cover having a series of openings and having dovetailed projections fitting the recesses in the wall of the tray, and means for locking said cover upon said tray, substantially as described.

9. The combination, with the filter-tray, provided with side walls and having openings in its bottom, a central bearing 67, and dovetailed recesses in the upper edges of its side walls, of a cover having a series of openings, and adapted to rest upon said bearing 67 and having projections engaging the dovetailed recesses in the walls of the tray, and the swiveled stud-hooks for locking said cover upon said tray, substantially as described.

10. The combination, with the filter-casing provided with ways on the inner surface of its walls, of the filter-trays provided with the removable covers, the stud-hooks for locking said covers upon said trays, said stud-hooks being prevented from turning when the tray is in position by engagement with the wall of the casing, substantially as described.

11. The combination, with the filter-casing and the trays arranged therein, of the door for closing and opening in the wall of said casing, a lock for said door, a cylinder provided with a piston for controlling said lock, means connecting said cylinder with the filter-casing or with the main, and a three-way cock for closing either of said connections, substantially as described.

Signed at Minneapolis, Minnesota, this 4th day of February, 1902.

FREDERICK S. BLACKMARR.
JOSEPH L. WILLFORD.

Witnesses:
A. C. PAUL,
C. G. HANSON.